(12) United States Patent
Susnjara et al.

(10) Patent No.: US 12,083,743 B2
(45) Date of Patent: Sep. 10, 2024

(54) METHODS AND APPARATUS FOR PROCESSING AND DISPENSING MATERIAL DURING ADDITIVE MANUFACTURING

(71) Applicant: Thermwood Corporation, Dale, IN (US)

(72) Inventors: Kenneth J. Susnjara, Birdseye, IN (US); Nicolas Vote, Newburgh, IN (US); Robert Gaesser, Dale, IN (US); Brian S. Smiddy, Newburgh, IN (US); Scott G. Vaal, Jasper, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 18/529,991

(22) Filed: Dec. 5, 2023

(65) Prior Publication Data

US 2024/0100773 A1    Mar. 28, 2024

Related U.S. Application Data

(60) Continuation of application No. 18/173,877, filed on Feb. 24, 2023, now Pat. No. 11,872,752, which is a
(Continued)

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/118* (2017.08); *B29C 64/379* (2017.08);
(Continued)

(58) Field of Classification Search
CPC ......... B33Y 40/00; B33Y 10/00; B33Y 30/00; B29C 64/379; B29C 64/118
See application file for complete search history.

(56) References Cited

U.S. PATENT DOCUMENTS

| 4,209,476 A | 6/1980 | Harris |
| 4,721,589 A | 1/1988 | Harris |

(Continued)

FOREIGN PATENT DOCUMENTS

| CA | 3003067 A1 | 4/2020 |
| EP | 1208956 B1 | 12/2005 |

(Continued)

OTHER PUBLICATIONS

International Search Report and Written Opinion in corresponding International Application No. PCT/US2017/040188, mailed Sep. 12, 2017 (14 pages).
(Continued)

*Primary Examiner* — Nathan T Leong
(74) *Attorney, Agent, or Firm* — Bookoff McAndrews, PLLC

(57) ABSTRACT

A system for additive manufacturing includes a nozzle configured to translate along a first axis, a second axis perpendicular to the first axis, and a third axis orthogonal to the first and second axes, wherein the nozzle is operably coupled to: an extruder having an outlet and including a screw disposed within a barrel, and a pump having an inlet and an outlet. The inlet is coupled to the extruder, and the outlet is in fluid communication with the nozzle. The system also includes a controller configured to adjust a speed of the pump with respect to a speed of the screw to apply a target pressure at the outlet of the extruder.

20 Claims, 12 Drawing Sheets

Related U.S. Application Data continuation of application No. 17/806,618, filed on Jun. 13, 2022, now Pat. No. 11,607,845, which is a continuation of application No. 17/396,391, filed on Aug. 6, 2021, now Pat. No. 11,383,438, which is a continuation of application No. 16/877,864, filed on May 19, 2020, now Pat. No. 11,104,072, which is a division of application No. 16/455,877, filed on Jun. 28, 2019, now Pat. No. 10,688,719, which is a continuation-in-part of application No. 15/253,290, filed on Aug. 31, 2016, now Pat. No. 10,377,124.

(51) Int. Cl.
*B29C 64/379* (2017.01)
*B33Y 40/00* (2020.01)
*B33Y 10/00* (2015.01)
*B33Y 30/00* (2015.01)

(52) U.S. Cl.
CPC ............... *B33Y 40/00* (2014.12); *B33Y 10/00* (2014.12); *B33Y 30/00* (2014.12)

(56) References Cited

U.S. PATENT DOCUMENTS

| | | | |
|---|---|---|---|
| 5,122,315 | A | 6/1992 | Darley |
| 5,605,937 | A | 2/1997 | Knaus |
| 5,695,789 | A | 12/1997 | Harris |
| 7,731,816 | B2 | 6/2010 | Oldani et al. |
| 7,810,539 | B2 | 10/2010 | Mischler et al. |
| 8,151,854 | B2 | 4/2012 | Oldani |
| 8,534,338 | B2 | 9/2013 | Oldani et al. |
| 8,954,180 | B2 | 2/2015 | Oldani |
| 10,377,124 | B2 | 8/2019 | Susnjara et al. |
| 2004/0032040 | A1 | 2/2004 | Harris |
| 2007/0044899 | A1 | 3/2007 | Tingley |
| 2008/0006017 | A1 | 1/2008 | Rindels |
| 2008/0020049 | A1 | 1/2008 | Darling et al. |
| 2010/0200168 | A1 | 8/2010 | Oldani et al. |
| 2012/0070523 | A1 | 3/2012 | Swanson et al. |
| 2012/0080814 | A1 | 4/2012 | Sun et al. |
| 2013/0078073 | A1 | 3/2013 | Comb et al. |
| 2013/0333798 | A1* | 12/2013 | Bosveld ................ B29C 64/329 141/2 |
| 2015/0035186 | A1 | 2/2015 | Teken et al. |
| 2015/0290875 | A1 | 10/2015 | Mark et al. |
| 2016/0075089 | A1* | 3/2016 | Duro Royo ........... B29C 64/118 425/166 |
| 2016/0263832 | A1 | 9/2016 | Bui et al. |
| 2017/0008230 | A1 | 1/2017 | Yuyama |
| 2018/0050502 | A1 | 2/2018 | Oldani |
| 2018/0056602 | A1 | 3/2018 | Susnjara et al. |
| 2019/0134900 | A1 | 5/2019 | Vaal |

FOREIGN PATENT DOCUMENTS

| | | |
|---|---|---|
| EP | 3112133 A1 | 1/2017 |
| WO | 2015050958 A2 | 4/2015 |
| WO | WO2015050958 * | 4/2015 |
| WO | 2015129733 A1 | 9/2015 |
| WO | 2018165761 A1 | 9/2018 |

OTHER PUBLICATIONS

International Search Report and Written Opinion in corresponding International Application No. PCT/US2020/038118, mailed Nov. 24, 2020 (18 pages).

Sloan, "Big additive machines tackle large molds," Composites World, Jun. 11, 2019 (8 pages).

Office Action issued in corresponding European Application No. 20735829.2, mailed Jan. 17, 2024.

* cited by examiner

METHODS AND APPARATUS FOR PROCESSING AND DISPENSING MATERIAL DURING ADDITIVE MANUFACTURING

CROSS-REFERENCE TO RELATED APPLICATIONS

This application is a continuation of U.S. patent application Ser. No. 18/173,877, filed on Feb. 24, 2023, which is a continuation of U.S. application Ser. No. 17/806,618, filed on Jun. 13, 2022, now U.S. Pat. No. 11,607,845, issued Mar. 21, 2023, which is a continuation of U.S. application Ser. No. 17/396,391, filed on Aug. 6, 2021, now U.S. Pat. No. 11,383,438, issued Jul. 12, 2022, which is a continuation of U.S. patent application Ser. No. 16/877,864, filed on May 19, 2020, now U.S. Pat. No. 11,104,072, issued Aug. 31, 2021, which is a divisional of U.S. patent application Ser. No. 16/455,877, filed on Jun. 28, 2019, now U.S. Pat. No. 10,688,719, issued Jun. 23, 2020, which is a continuation-in-part of U.S. patent application Ser. No. 15/253,290, filed on Aug. 31, 2016, now U.S. Pat. No. 10,377,124, issued Aug. 13, 2019, the entireties of which are incorporated by reference herein.

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., 3D printing manufacturing techniques or processes.

BACKGROUND

Additive manufacturing techniques and processes generally involve the buildup of one or more materials to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including freeform fabrication, 3D printing, rapid prototyping/tooling, etc. Additive manufacturing techniques are capable of fabricating complex components from a wide variety of materials. Generally, a freestanding object can be fabricated from a computer-aided design (CAD) model.

A particular type of additive manufacturing is more commonly known as 3D printing. One such process commonly referred to as Fused Deposition Modeling (FDM) comprises a process of melting a very thin layer of a flowable material (e.g., a thermoplastic material), and applying this material in layers to produce a final part. This is commonly accomplished by passing a continuous thin filament of thermoplastic material through a heated nozzle, which melts the thermoplastic material and applies it to the structure being printed. The heated material is applied to the existing structure in thin layers, melting and fusing with the existing material to produce a solid finished product.

The filament used in the aforementioned process is generally produced using an extruder. In some instances, the extruder may include a specially designed screw rotating inside of a barrel. The barrel may be heated. Thermoplastic material in the form of small pellets is introduced into one end of the rotating screw. Friction from the rotating screw, combined with heat from the barrel softens the plastic, which then is forced under pressure through a small opening in a die attached to the front of the extruder barrel. This extrudes a string of material which is cooled and coiled up for use in the 3D printer as the aforementioned filament of thermoplastic material.

Melting a thin filament of material in order to 3D print an item is a slow process, which is generally only suitable for producing relatively small items or limited number of items. As a result, the melted filament approach to 3D printing is too slow for the manufacture of large items or larger number of items. However, 3D printing using molten thermoplastic materials offers many benefits for the manufacture of large items or large numbers of items.

A common method of additive manufacturing, or 3D printing, generally includes forming and extruding a bead of flowable material (e.g., molten thermoplastic), applying the bead of material in a strata of layers to form a facsimile of an article, and machining such facsimile to produce an end product. Such a process is generally achieved by means of an extruder mounted on a computer numeric controlled (CNC) machine with controlled motion along at least the X, Y, and Z-axes. In some cases, the flowable material, such as, e.g., molten thermoplastic material, may be infused with a reinforcing material (e.g., strands of fiber) to enhance the material's strength. The flowable material, while generally hot and pliable, may be deposited upon a substrate (e.g., a mold), pressed down or otherwise flattened to some extent, and leveled to a consistent thickness, preferably by means of a tangentially compensated roller mechanism. The flattening process may aid in fusing a new layer of the flowable material to the previously deposited layer of the flowable material. In some instances, an oscillating plate may be used to flatten the bead of flowable material to a desired thickness, thus effecting fusion to the previously deposited layer of flowable material. The deposition process may be repeated so that each successive layer of flowable material is deposited upon an existing layer to build up and manufacture a desired component structure. When executed properly, the new layer of flowable material may be deposited at a temperature sufficient enough to allow a new layer of such material to melt and fuse with a previously deposited layer, thus producing a solid part.

In the practice of the aforementioned process, a major disadvantage has been encountered. Material extruders, of the type used in near net shape 3D printing, are designed to operate at a constant steady rate in order to produce a steady, consistent homogeneously melted plastic bead. In most cases, however, the majority of heat energy required to melt the plastic is generated by friction from a screw turning inside a barrel. This steady extrusion rate, however, creates difficulties when 3D printing. Specifically, the computer numeric controlled (CNC) machine used to move the extruder-based print head cannot start and stop instantaneously, and must, by necessity, vary in speed as it traces the path required to print the part.

This combination of a machine moving at variable speeds and an extrusion head outputting material at a constant rate results in a print bead that could vary in size. That is, the bead is thicker when the machine head is moving slowly, and thinner when the machine operates at a relatively higher speed.

A common approach employed in addressing the aforementioned problem is to servo-control the extrusion screw, speeding it up when the machine is moving faster and slowing it down as the machine motion slows. Since much of the energy used to melt the plastic is generated by rotation of the screw in the barrel of the extruder, varying the speed not only varies the rate by which material is pumped through the extruder but it also varies the amount of heat energy generated for melting the flowable material, such as, e.g., thermoplastic. The consequential increased temperature results in the thermoplastic material being less viscous; and, therefore, flowing faster than when it is cooler and thereby more viscous. The effect is that the flow rate from the extruder at any point in time is determined not only by the rotational speed of the extrusion screw, but also by the recent history of rotation, which determines how hot and thus how viscous the melted material is. This means that in a system where the rotation speed of an extruder varies randomly with time, the amount of material flowing from an extruder at a specific rotation speed will not be at a constant rate. Therefore, if the extruder screw is servo-controlled to operate at a specific rotational speed for a specific velocity of the print head, the resulting printed bead will not be consistent. Thus, method and apparatus are needed to produce a consistent print bead size when 3D printing.

Furthermore, the extruder may function to take polymer material in pellet form, heat, soften, and mix the material into a homogenized melt, and then pump the melt under pressure into a die to form the material into a useful extruded shape. This may be accomplished by providing an auger-type screw rotating inside a heated barrel, for example. The geometry, clearances, composition, and functionality of the screw and a barrel of the extruder may be determined as necessary to provide an extruder that operates as desired.

The extruder may be provided with the goal of completely mixing the melted material (e.g., polymer material) into a smooth, consistent form with no unmelted pellet portions or temperature variations in the melted material. One method of achieving this objective includes installing a breaker plate at the exit end of the extruder. A breaker plate may be, for example, a disk or plate that has a series of holes that provide resistance to the flow of the polymer melt. The holes in the breaker plate may be uniform holes approximately 0.125" inches in diameter, and may be machined through the entire thickness of the breaker plate so as to be aligned with the flow direction of the polymer melt. This breaker plate may restrict the flow of material, increasing pressure inside the extruder barrel which assists in the melting and mixing process. One or more mesh screens or filters may be installed before the breaker plate to further restrict flow and increase pressure to aid mixing.

There may an optimal pressure range within which a particular extruder operates most effectively. Generally, a breaker plate and one or more mesh screens are installed in an effort to generate and maintain this desired pressure during operation of the extruder. While the inclusion of a breaker plate and/or screen may improve some mixing characteristics, they may also introduce drawbacks. For example, the additional restriction to flow may reduce throughput. Additionally, different polymers may require different breaker plate and/or screen configurations to achieve a desired pressure. Thus, the breaker plate and/or screen may need to changed each time the polymer being extruded changes in order to achieve a desired pressure that corresponds to the extruded polymer.

Another approach to achieve enhanced mixing may be to include knobs or other shapes on the extrusion screw, creating a "mixing section" which agitates the melt. This approach may also reduce flow of the melt and, in some cases, the friction caused by the mechanical mixing action can create unwanted heat in the mixing section.

Another purpose of the screen and/or breaker plate may be to create a generally fixed amount of resistance to the material flow in the extruder. This may facilitate generating and maintaining a steady state melt process within the extruder. If the breaker plate and/or screen were not in place in a typical extruder configuration, the amount of resistance to melt flow, and thus the operating pressure inside the extruder may depend solely or nearly primarily on the amount of resistance created by the shape of the forming die through which the melt flows after exiting the extruder. It may then become difficult to achieve consistent operation since the extruder may process material through a variety of different die shapes, each with a different resistance to flow. Some dies may generate insufficient resistance to flow to achieve optimal operating pressure while others may generate significantly higher pressure than is desired.

SUMMARY

Aspects of the present disclosure relate to, among other things, methods and apparatus for fabricating components via additive manufacturing, such as, e.g., 3D printing techniques. Each of the aspects disclosed herein may include one or more of the features described in connection with any of the other disclosed aspects.

In one aspect, a system for additive manufacturing may include a nozzle configured to translate along a first axis, a second axis perpendicular to the first axis, and a third axis orthogonal to the first and second axes, wherein the nozzle may be operably coupled to: an extruder having an outlet and including a screw disposed within a barrel, and a pump having an inlet and an outlet. The inlet may be coupled to the extruder, and the outlet may be in fluid communication with the nozzle. The system may also include a controller configured to adjust a speed of the pump with respect to a speed of the screw to apply a target pressure at the outlet of the extruder.

In another aspect, a system for additive manufacturing may include a nozzle configured to translate along a first axis, a second axis perpendicular to the first axis, and a third axis orthogonal to the first and second axes. The nozzle may be operably coupled to: an extruder including a screw disposed within a barrel, and a pump having an inlet and an outlet wherein the inlet may be coupled to the extruder, and the outlet may be in fluid communication with the nozzle. The system may include a controller configured to modify a size of a bead extruded by the nozzle to maintain an approximately constant sized overlap between a plurality of adjacent beads.

In another aspect, an additive manufacturing method for delivering a flowable material from a nozzle of a programmable computer numeric control machine (CNC) may include actuating an extruder to form a flowable material, delivering the flowable material to a pump, and operating the pump at a speed. The method may also include adjusting at least one of the speed of the pump or a rate of translation of the nozzle based on a size of a boundary area formed by at least one adjacent bead of flowable material.

As used herein, the terms "comprises," "comprising," or any other variation thereof, are intended to cover a non-exclusive inclusion, such that a process, method, article, or apparatus. The term "exemplary" is used in the sense of "example," rather than "ideal."

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

Figure 1:
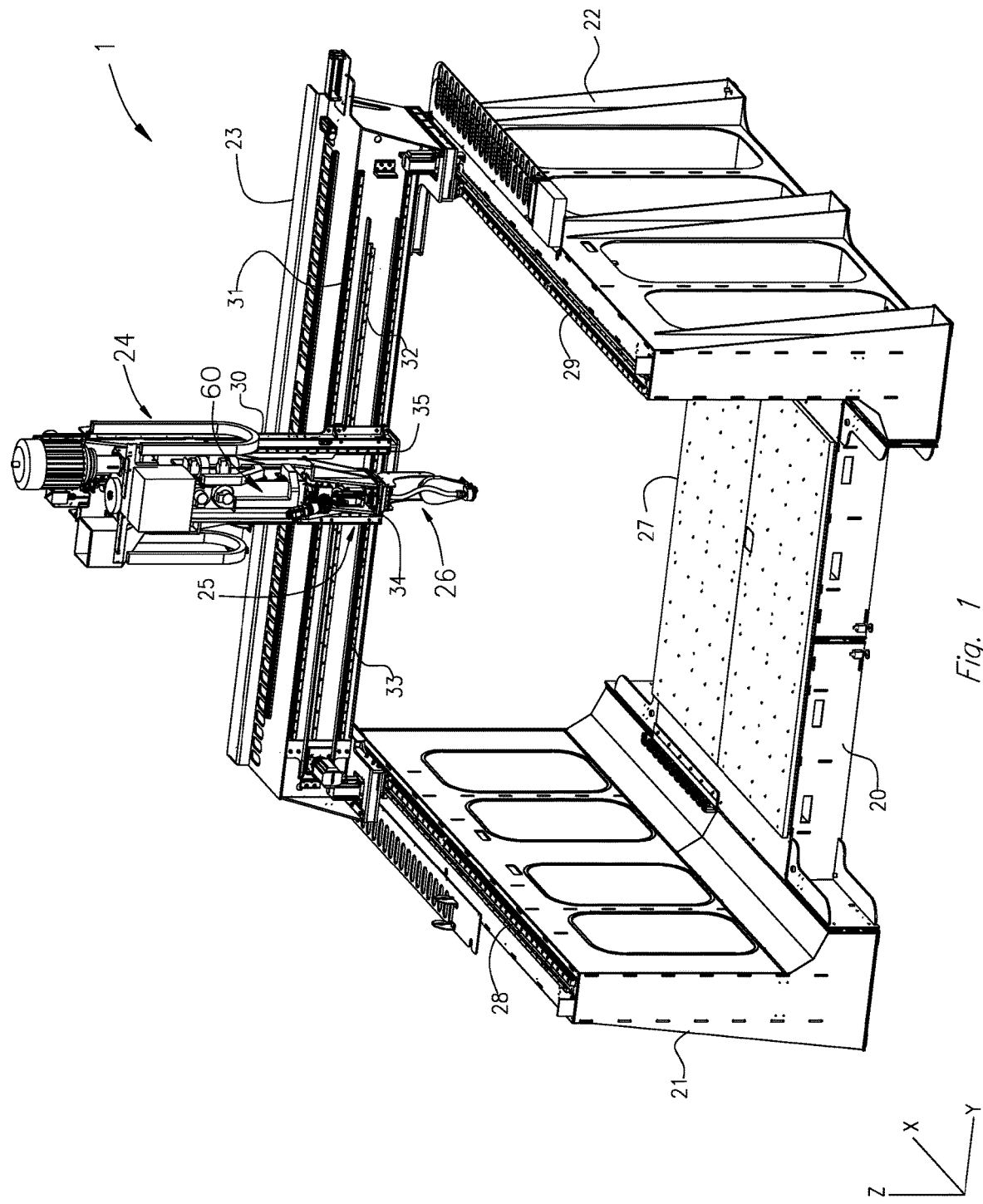
FIG. 1 is a perspective view of an exemplary CNC machine operable pursuant to an additive manufacturing process in the formation articles, according to an aspect of the present disclosure.

The present disclosure is drawn to, among other things, methods and apparatus for fabricating multiple components via additive manufacturing techniques, such as, e.g., 3D printing. More particularly, the methods and apparatus described herein comprise a method for eliminating, or otherwise substantially minimizing variations in the flow-rate of a molten flowable material (e.g., a thermoplastic material) in an additive manufacturing process, by, e.g., providing a servo-controlled fixed-displacement pump (e.g., polymer pump) between the output of an extruder and an application nozzle of a CNC additive manufacturing machine. For purposes of brevity, the methods and apparatus described herein will be discussed in connection with fabricating parts from thermoplastic materials. However, those of ordinary skill in the art will readily recognize that the disclosed apparatus and methods may be used with any flowable material suitable for additive manufacturing, such as, e.g., 3D printing.

In one aspect, the present disclosure is directed to an extruder-based 3D printing head that can deposit melted material (e.g., thermoplastic material) when the print head is traveling at a high rate of speed. In another aspect, the present disclosure is directed to depositing material at a consistent controlled rate at any time regardless of melt temperature variations caused by the history of changes in rotational speed of a screw of the extruder.

In certain sectors of the plastics industry, there are applications in which polymer pumps (also referred to herein as a gear pump) are sometimes utilized, in conjunction with plastic extruders. A polymer pump is a fixed displacement gear pump, which meters a fixed amount of material with each rotation of the pump. Polymer pumps are typically used in operations such as the co-extrusion of two or more materials, where synchronization of the flow rates is critical.

In order for a polymer pump to function properly, the plastic extruder must supply melted material to the input of the polymer pump at a relatively fixed input pressure. The aforementioned method of controlling the rotation of the extruder screw by means of a servo loop (e.g., speeding up the rotation when the pressure drops, or is too low, and slowing down the rotation when the pressure is high) works well in a basic extrusion application because input pressure variations in such a situation are generally slight. As a result, only minor changes to the rotational speed of the extruder screw are necessary to ensure the polymer pump receives melted material at a relatively constant input pressure.

In 3D printing, however, the addition a polymer pump alone to regulate flow-rate does not work satisfactorily. The 3D printing process by nature requires frequent variations in the speed of the print head due to a number of factors. For example, one factor may include speed changes, which are required when applying material in tight arcs or through corners. Speed changes may be necessary when a change in direction of travel for the print head is required. Even with the addition of a polymer pump, variations in the flow rate of such a pump can be dramatic, resulting in servo demands for rapid and substantial changes in extruder rotation speed. A rapid change in extruder screw rotation speed does not immediately translate into a rapid change in flow rate of the melted flowable material. There is a substantial delay between a change in extruder screw speed and a resulting change in flow rate of the melted material. This delay makes the traditional steady state servo approach unworkable when operating with a polymer pump that varies in output rate. For example, if the extruder accelerates quickly, as material is advanced within, the input pressure to the polymer pump will drop, resulting in the servo system quickly increasing the speed of the extruder screw. A delay in the drop in input pressure until after material is moving in the polymer pump, combined with a delay in increased flow rate from the extruder, may allow the input pressure to drop low enough to interrupt a proper flow of material, which results in a deposited bead of inconsistent size and shape.

To address the aforementioned problem, the present disclosure utilizes a modified servo signal approach. Using special algorithms, the control system coordinates the extruder speed with the speed of the polymer pump (gear pump) so that speed increases and/or decreases in both units at the same time. In addition to being simultaneous, the speed changes may be proportional.

With reference now to FIG. 1 of the drawings, there is illustrated a programmable computer numeric control (CNC) machine 1 embodying aspects of the present disclosure. A controller (not shown) may be operatively connected to machine 1 for displacing an application nozzle along a longitudinal line of travel or x-axis, a transverse line of travel or a y-axis, and a vertical line of travel or z-axis, in accordance with a program inputted or loaded into the controller for performing an additive manufacturing process to replicate a desired component. CNC machine 1 may be configured to print or otherwise build 3D parts from digital representations of the 3D parts (e.g., AMF and STL format files) programmed into the controller. For example, in an extrusion-based additive manufacturing system, a 3D part may be printed from a digital representation of the 3D part in a layer-by-layer manner by extruding a flowable material. The flowable material may be extruded through an extrusion tip carried by a print head of the system, and is deposited as a sequence of beads or layers on a substrate in an x-y plane. The extruded flowable material may fuse to previously deposited material, and may solidify upon a drop in temperature. The position of the print head relative to the substrate is then incrementally advanced along a z-axis (perpendicular to the x-y plane), and the process is then repeated to form a 3D part resembling the digital representation.

Machine 1 includes a bed 20 provided with a pair of transversely spaced side walls 21 and 22, a gantry 23 supported on side walls 21 and 22, carriage 24 mounted on gantry 23, a carrier 25 mounted on carriage 24, an extruder 60, and an applicator assembly 26 mounted on carrier 25. Supported on bed 20 between side walls 21 and 22 is a worktable 27 provided with a support surface disposed in an x-y plane, which may be fixed or displaceable along an x-axis. In the displaceable version, the worktable 27 may be displaceable along a set of rails mounted on the bed 20 by means of servomotors and rails 28 and 29 mounted on the bed 20 and operatively connected to the worktable 27. Gantry 23 is disposed along a y-axis, supported at the ends thereof on end walls 21 and 22, either fixedly or displaceably along an x-axis on a set of guide rails 28 and 29 provided on the upper ends of side walls 21 and 22. In the displaceable version, the gantry 23 may be displaceable by a set of servomotors mounted on the gantry 23 and operatively connected to tracks provided on the side walls 21 and 22 of the bed 20. Carriage 24 is supported on gantry 23 and is provided with a support member 30 mounted on and displaceable along one or more guide rails 31, 32 and 33 provided on the gantry 23. Carriage 24 may be displaceable along a y-axis on one or more guide rails 31, 32 and 33 by a servomotor mounted on the gantry 23 and operatively connected to support member 30. Carrier 25 is mounted on a set of spaced, vertically disposed guide rails 34 and 35 supported on the carriage 24 for displacement of the carrier 25 relative to carriage 24 along a z-axis. Carrier 25 may be displaceable along the z-axis by a servomotor mounted on carriage 24 and operatively connected to carrier 25.

Figure 1A:
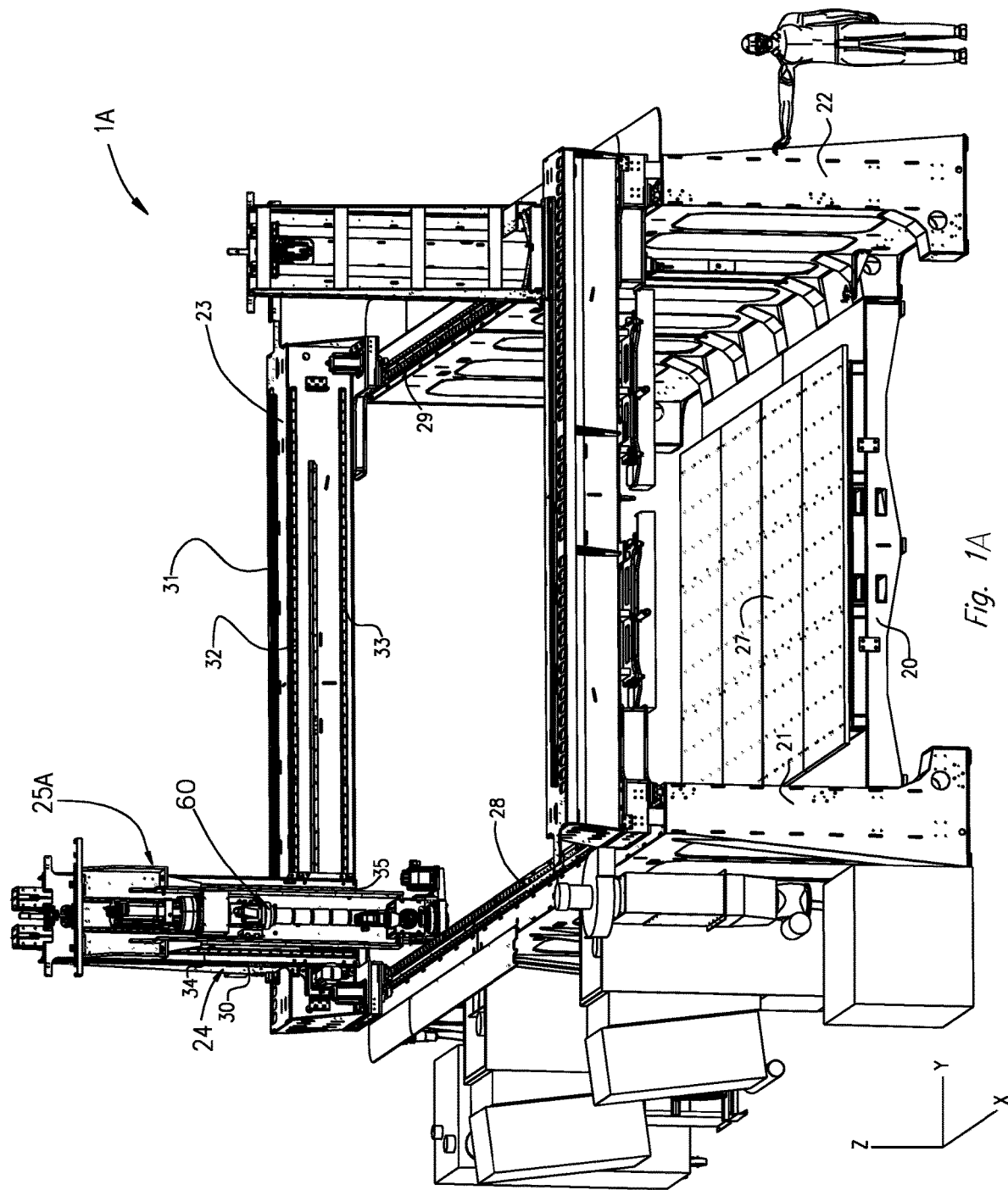
FIG. 1A is a perspective view of an exemplary CNC machine operable pursuant to an additive manufacturing process in the formation articles, according to another aspect of the present disclosure.

FIG. 1A shows a machine 1A, which may be a programmable computer numeric control (CNC) machine embodying aspects of the present disclosure. Features of machine 1A that correspond to features of machine 1 are indicated with the same numerals and may be provided in the same manner described above with respect to machine 1. Machine 1A may include a carrier 25A that operates in a manner similar to carrier 25.

Figure 2:
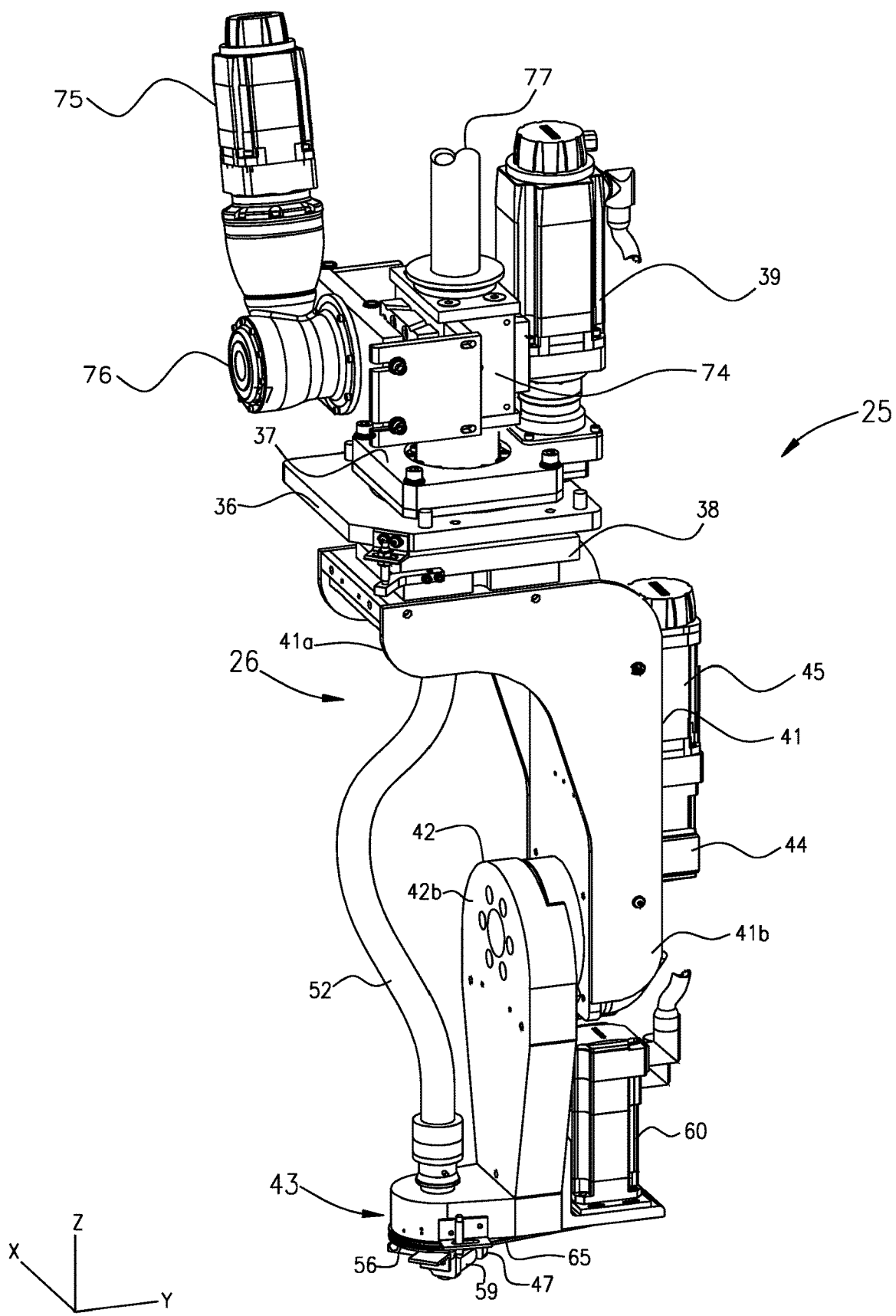
FIG. 2 is an enlarged perspective view of an exemplary carriage and applicator assembly of the exemplary CNC machine shown in FIG. 1.
Figure 3:
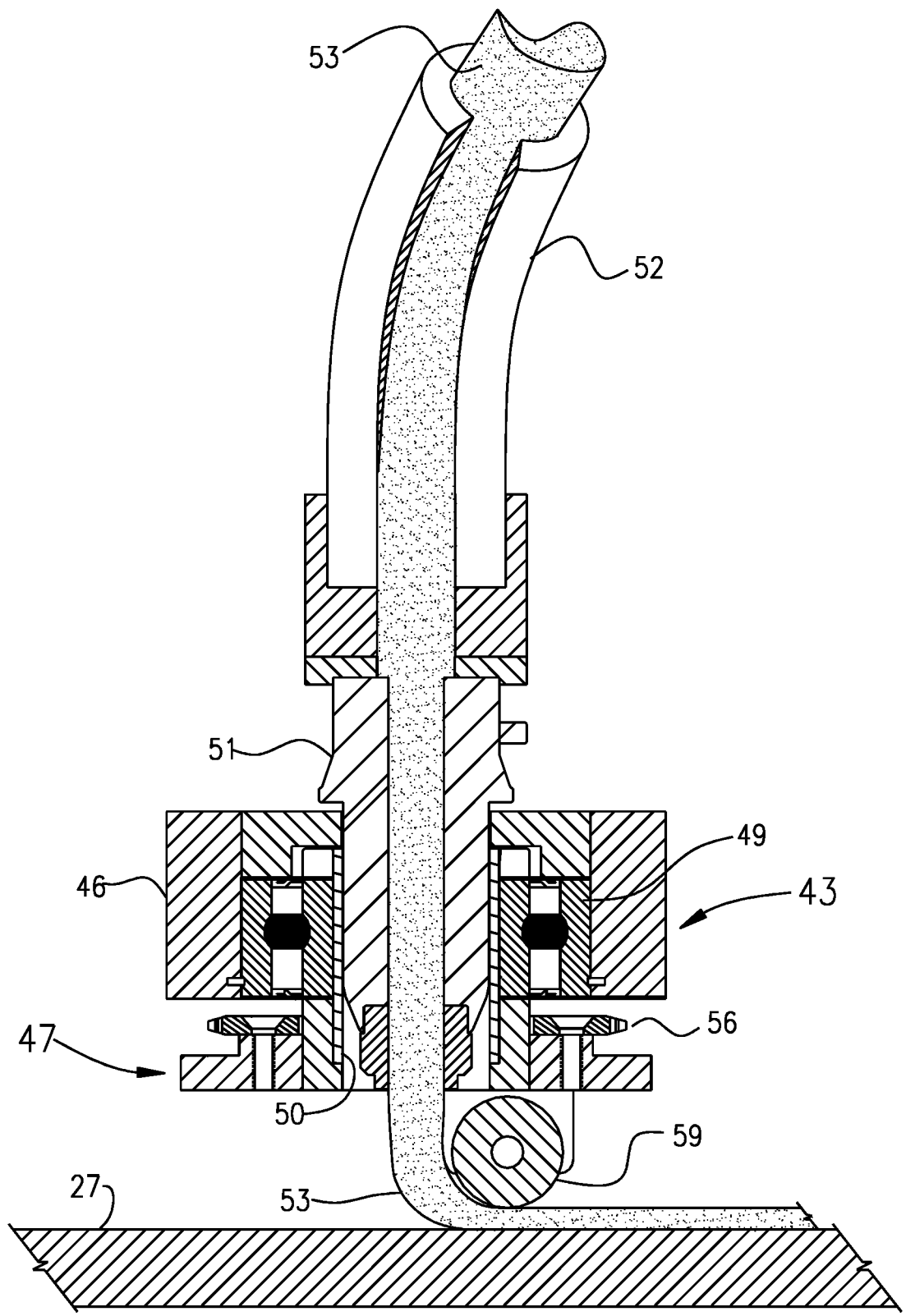
FIG. 3 is an enlarged cross-sectional view of an exemplary applicator head assembly of the exemplary carriage assembly of FIG. 2.

As best shown in FIG. 2, carrier 25 is provided with a base platform 36, a gear box 37 fixedly mounted on the upper side thereof, and a mounting platform 38 rotatably mounted on the underside of base platform 36. Fixedly mounted to the case of gearbox 37 is a positive displacement gear pump 74, driven by a servomotor 75, through a gearbox 76. Gear pump 74 receives molten plastic from extruder 60, shown in FIG. 1, through an input port 77, shown in FIG. 2. Platform 38 may be provided with openings therethrough disposed along the z-axis of the carrier 25. Gear box 37 may be provided with a gear arrangement having an opening therethrough and disposed coaxially with the aligned openings in gear box 37 and platforms 36 and 38, operatively connected to platform 38 for rotation about the z-axis and rotatable about such axis by means of a servomotor 39 mounted on base platform 36 and operatively connected to such gear arrangement. Applicator assembly 26 may include an upper segment 41 and a lower segment 42. Upper segment 41 includes a transverse portion 41a secured to the underside of mounting platform 38 for rotational movement about the z-axis. Upper segment 41 may be provided with an opening therethrough along such z-axis, and a depending portion 41b may be disposed substantially parallel relative to such z-axis. Lower segment 42 includes a housing 42b disposed on an inner side of depending portion 41b. Housing 42b may be mounted on a shaft journalled in a lower end of depending portion 41b, intersecting and disposed perpendicular to the z-axis of carrier 25, and further housing 42b may be provided with a laterally projecting applicator head 43 at a free end thereof. Mounted on a gearbox 44 provided on an outer side of depending portion 41b (opposite housing 42b) is a servomotor 45 operatively connected through gearbox 44 to the shaft journalled in depending portion 41b. Servomotor 45 may be configured for pivotally displacing lower segment 42 in a y-z plane. A material tamping roller 59 (shown in FIG. 3), rotatably mounted in carrier bracket 47, provides a means for flattening and leveling a bead of flowable material (e.g., molten thermoplastic), as shown in FIG. 3. Carrier bracket 47 may be adapted to be rotationally displaced by means of a servomotor 60 (shown in FIG. 2), through a sprocket 56 and drive-chain 65 arrangement.

Figure 2A:
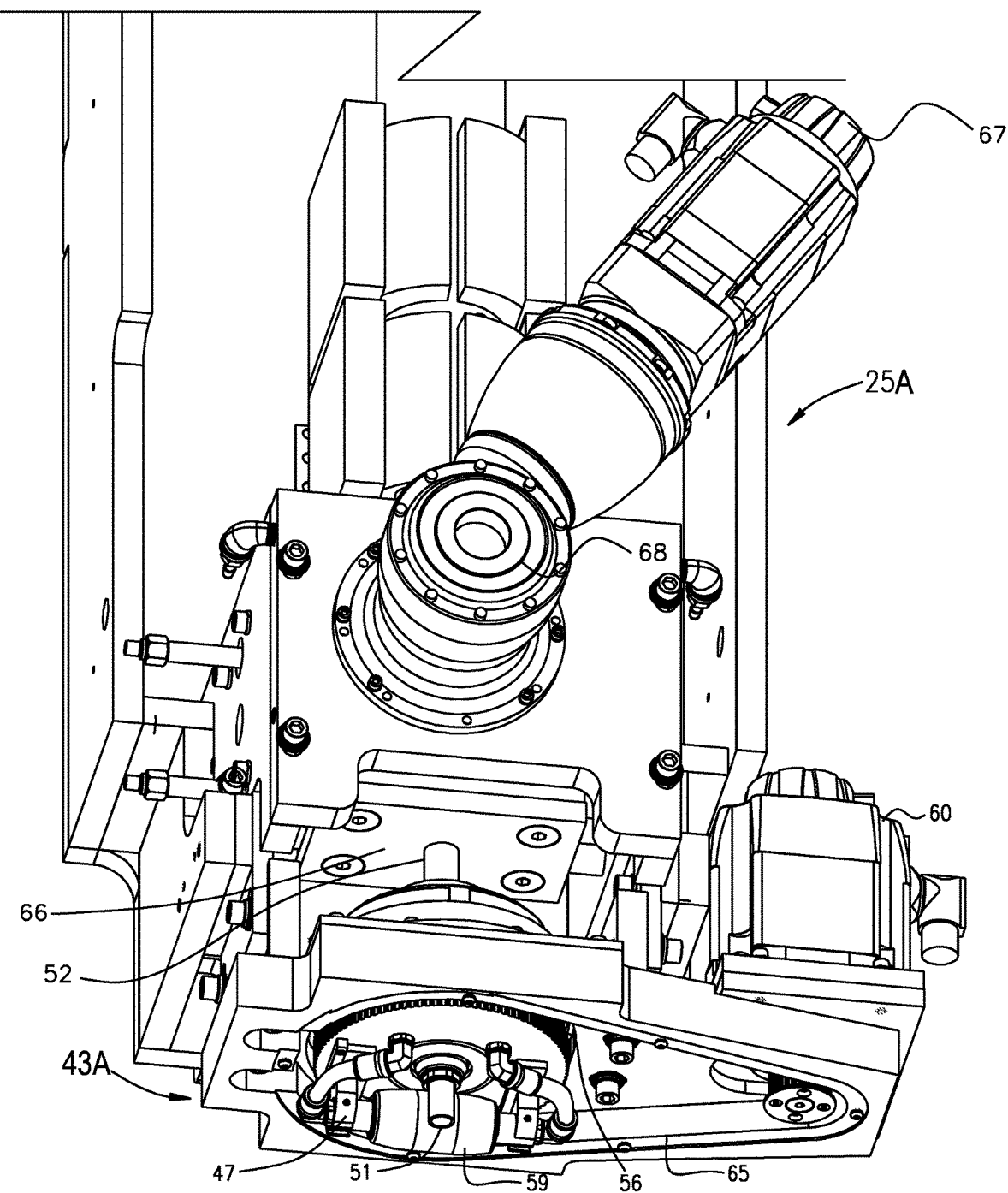
FIG. 2A is an enlarged perspective view of an exemplary carriage and applicator head of the exemplary CNC machine shown in FIG. 1A.
Figure 3A:
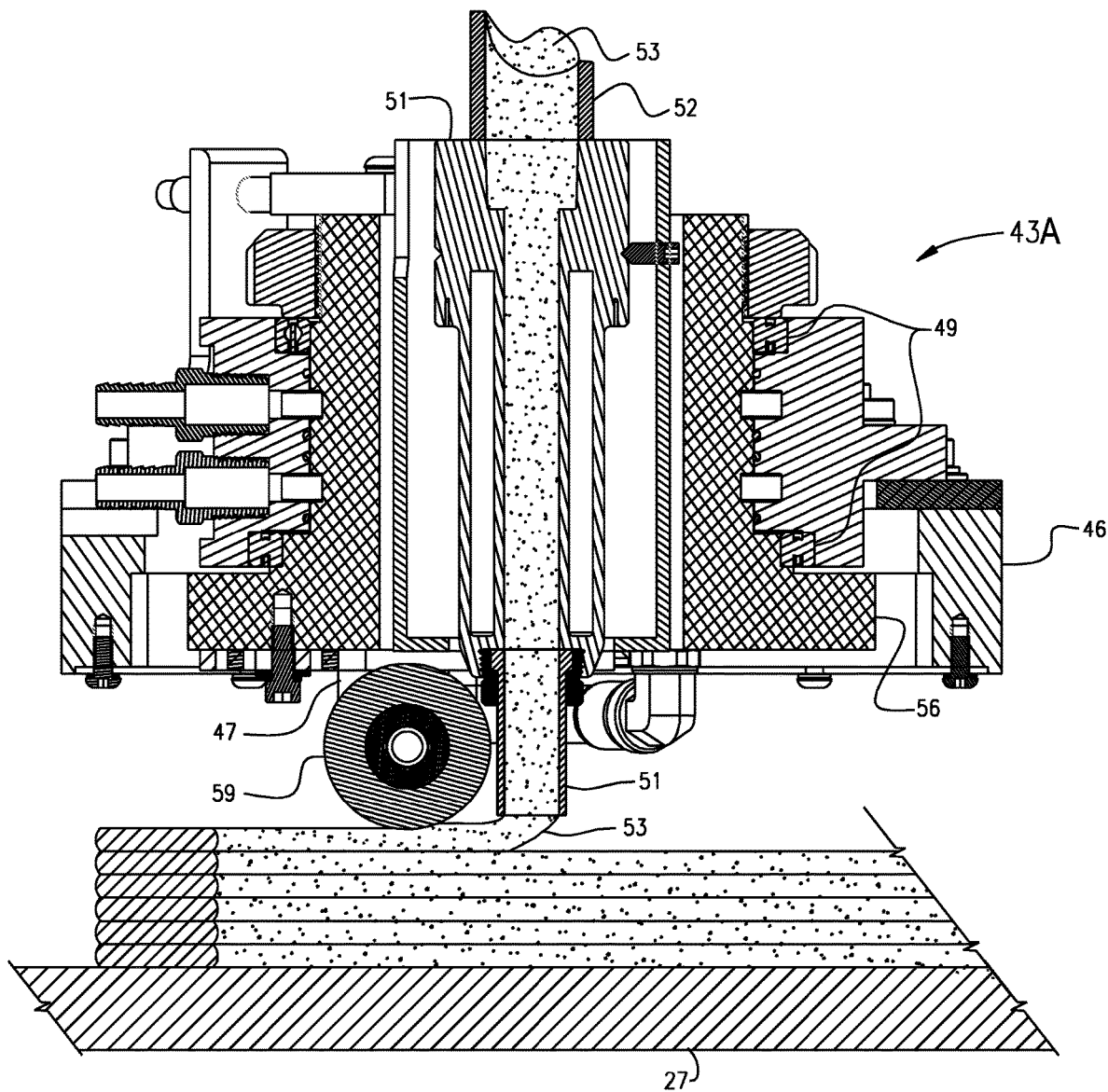
FIG. 3A is an enlarged cross-sectional view of an exemplary applicator head of FIG. 2A.

As shown in FIG. 2A, machine 1A may include a carrier 25A provided with a positive displacement gear pump 66, driven by a servomotor 67 through a gearbox 68. Gear pump 66 may receive molten plastic from extruder 60, as shown in FIG. 1A. Material may be pushed out of gear pump 66 to an applicator head 43A. The material may proceed from gear pump 66 and through nozzle 51 to a substrate such as a surface of worktable 27 in front of material tamping roller 59. Roller 59 may be rotatably mounted in carrier bracket 47, and may provide a means for flattening and leveling a bead of flowable material as shown in FIG. 3A, for example. Carrier bracket 47 may be adapted to be rotationally displaced by means of a servomotor 60, through a sprocket or gear 56 and a drive chain or belt 65.

With reference to FIG. 3, applicator head 43 of machine 1 may include a housing 46 with a roller bearing 49 mounted therein. Carrier bracket 47 is fixedly mounted to an adaptor sleeve 50, journalled in bearing 49. As best shown in FIGS. 2-3, a conduit 52 including an elongated, flexible material for conveying, e.g., a molten bead of a flowable material (e.g., molten thermoplastic) under pressure from a source (e.g., one or more extruder 60 and an associated polymer or gear pump) disposed on carrier 25, to applicator head 43, may be fixedly (or removably) connected to, and in communication with nozzle 51. An intermediate portion of conduit 52 may be routed through the openings through gear box 37, base platform 36 and mounting platform 38, and along the z-axis of carrier 25. In use, the flowable material 53 (e.g., melted thermoplastic) may be heated sufficiently to form a molten bead thereof, which is then forced through conduit 52 and delivered through applicator nozzle 51, to form multiple rows of deposited material 53 in the form of molten beads, as described herein. Such beads of molten material 53 may be flattened, leveled, and/or fused to adjoining layers by any suitable means, such as, e.g., bead-shaping roller 59, to form an article. Even though bead-shaping roller 59 is depicted as being integral with applicator head 43, bead-shaping roller 50 may be separate and discrete from applicator head 43. In some embodiments, the deposited material 53 may be provided with a suitable reinforcing material, such as, e.g., fibers that facilitate and enhance the fusion of adjacent layers of extruded flowable material 53.

With reference to FIG. 3A, applicator head 43A of machine 1A may include a housing 46 with a roller bearings 49 mounted therein. A conduit 52 for conveying a molten bead of flowable material under pressure from one or more of extruder 60 and gear pump 66 to applicator head 43A may be fixedly (or removably) connected to, and in communication with, a nozzle 51. Thus, applicator head 43A may operate in a manner similar to applicator head 43 of machine 1.

In some embodiments, machines 1 and 1A may include a velocimetry assembly (or multiple velocimetry assemblies) configured to determine flow rates (e.g., velocities and/or volumetric flow rates) of material 53 being delivered from applicator heads 43 and 43A. The velocimetry assembly preferably transmits signals relating to the determined flow rates to the aforementioned controller coupled to machine 1, which may then utilize the received information to compensate for variations in the material flow rates.

In the course of fabricating a component, pursuant to the methods described herein, the control system of the machine 1, in executing the inputted program, may control the several servomotors described above to displace the gantry 23 along the x-axis, displace the carriage 24 along the y-axis, displace the carrier 25 along a z-axis, pivot lower applicator segment 42 about an axis disposed in an x-y plane and rotate bracket 47 about a z-axis thereof, in accordance with the inputted program, to appropriately deliver material 53 and provide the desired end product or a near duplicate thereof. The control system of machine 1A may control the several servomotors to display gantry 23, carriage 24, and carrier 25A in a similar manner to appropriate deliver material 53.

Figure 4:
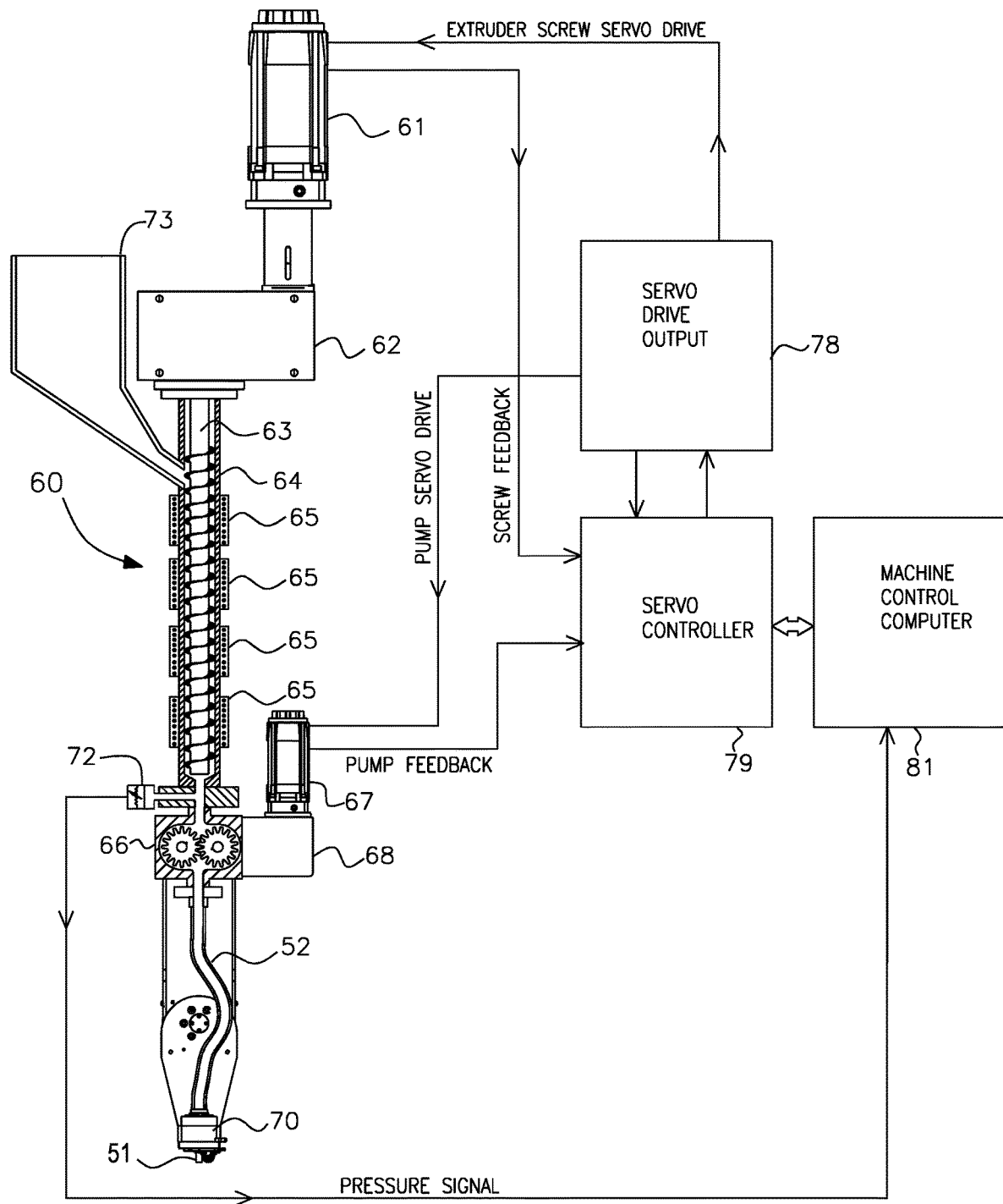
FIG. 4 is a cross-sectional view of a schematic representation of the major mechanical components of an extruder assembly of the present disclosure, along with an exemplary flow diagram of the associated servo signals.

With reference now to FIG. 4, there is illustrated, a cross-sectional schematic representation of a thermoplastic extrusion and application system, along with a block diagram of an exemplary servo control circuit, according to aspects of the present disclosure. FIG. 4 depicts an extruder 60, comprising a heavy duty screw 63, rotatably mounted inside a barrel 64, and driven by a servomotor 61 through a gearbox 62. One or both of the screw 63 and barrel 64 may be made of steel. Pellets of material may be introduced into barrel 64 from a hopper 73. Those of ordinary skill will recognize that the pellets may be of any suitable material. For example, in one embodiment, pellets may be made of thermoplastic material. In addition to pellets, the material may be delivered to hopper 73 in any suitable size or configuration. The pellets introduced into barrel 64 may be heated by the friction generated from the rotation of screw 63 and/or one or more barrel heaters 65 disposed alone a length of barrel 64. Once the pellets have melted, the molten material may be forced under pressure by screw 63, into a servo-controlled gear pump 66, driven by a servomotor 67, through a gearbox 68. Subsequently, the molten material is delivered from an outlet of gear pump 66 to conduit 52 (FIGS. 2, 2A, 3, 3A) for use in 3D printing activities, as described above.

A stable flow rate into conduit 52 and through application nozzle 51 may be regulated by providing servo control of the speed of gear pump 66, through an exemplary controller formed by the machine's control computer 81 and servo control system, based on the speed of the CNC machine's moving axes. The speed of extruder screw 63 likewise may be regulated in proportion with the speed of gear pump 66 by a servo control loop. A signal from the gear pump servo loop is processed to control the output of the extruder servo drive in proportion with that of gear pump 66, thus synchronizing the speed of the extruder with that of the gear pump by a predetermined proportion. In other words, the operation speed of gear pump 66 and extruder screw 63 may be dependent on one another. That is, the speed of extruder screw 63 may be determined as a function of the speed of gear pump 66, and vice versa. The speed of extruder screw 63 also may be modified by inputs from one or more sensors 72 (e.g., a pressure sensor or a flow sensor) operably coupled to the extruder.

As the feed rate of the CNC machine changes, representative servo feed-back signals from the moving axes are processed in the machine control computer 81 to control the speed of output pump 66, and correspondingly, the speed of extruder screw 63. Stated differently, machine control computer 81 serves to increase and/or decrease the speeds of extruder screw 63 and gear pump 66 based on increases/decreases in movement of CNC machine 1 during a 3D printing manufacturing process. In embodiments where sensor 72 is a pressure sensor, sensor 72 may monitor the pressure at the inlet of gear pump 66, outputting an analog signal into servo controller 79 and/or machine control computer 81, which in turn, influences the servo loop controlling the extruder screw 63 to bias, adjust, or otherwise fine tune the synchronized speed between extruder screw 63 and gear pump 66, in order to compensate for pressure changes at the inlet of gear pump 66. That is, changes in pressure at the inlet of gear pump 66 may further be used to modify the speeds of extruder screw 63 and/or gear pump 66 and the relative speeds thereof. By coordinating the speed of the gear pump 66 with the speed of the extruder screw 63, while compensating for pressure variations, a constant output proportional to the feed rate of the CNC machine may be achieved at the output of gear pump 66, and through application nozzle 51. With this approach, input pressure is relatively constant because the extruder screw 63 and gear pump 66 change speeds at the same time, with minor adjustments being made to compensate for variables resulting from melt-temperature and pressure variations. Thus, the dimensions of a deposited bead of material remains relatively consistent and dimensionally stable throughout the application process.

Figure 4A:
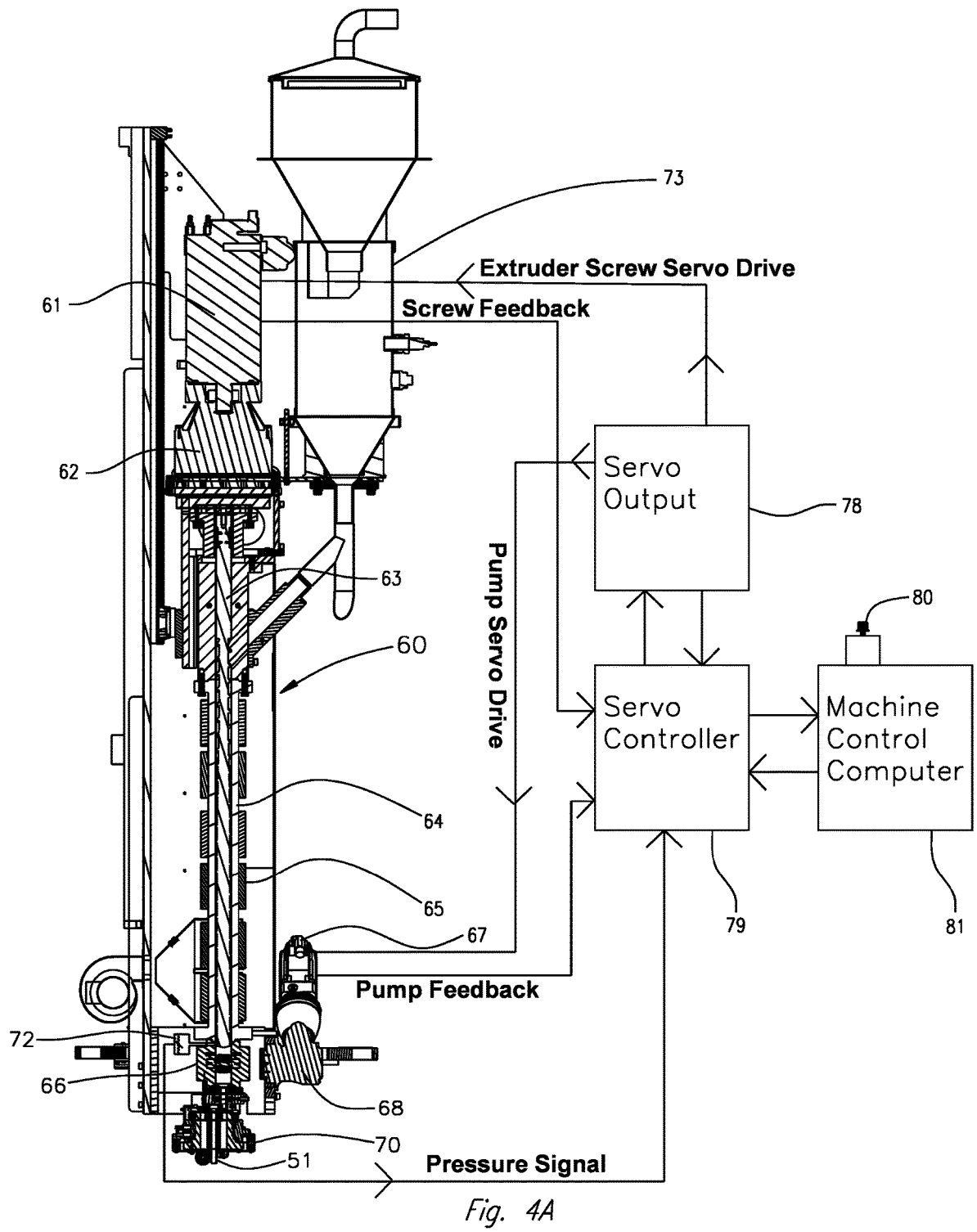
FIG. 4A is a cross-sectional view of a schematic representation of the major mechanical components of an extruder assembly of the exemplary CNC machine shown in FIG. 1A, along with an exemplary flow diagram of the associated servo signals.

FIG. 4A illustrates a cross-sectional schematic representation of a thermoplastic extrusion and application system, along with a block diagram of an exemplary servo control circuit. Extruder 60 may be driven by servomotor 61 through gearbox 62, as discussed above with respect to machine 1 and FIG. 4. A stable flow rate to conduit 52 and through nozzle 51 may similarly be regulated by providing servo control of the speed of gear pump 66, through an exemplary controller formed by the control computer 81 and servo control system, based on the speed of the moving axes of machine 1A. Thus, machine 1A may be configured to provide a consistent and dimensionally stable bead of material in a manner described above with respect to machine 1.

In addition to providing a consistent and dimensionally stable bead of material, CNC machines 1, 1A may also include a gear pump control switch 80 that provides a user the ability to modify a size of the deposited bead of material. Control switch 80 may be a hardware switch connected to machine control computer 81 and may control a speed (e.g., revolutions per minute) of gear pump 66, for example. By manipulating (e.g., rotating) control switch 80, an operator may cause machine control computer 81 to increase or decrease the size of the deposited bead, as described below. After this manipulation, the modified size may be deposited in a consistent and dimensionally stable manner. Control switch 80 may be a knob, button(s), lever, or other physical switch. When physical, control switch 80 may be provided on a cabinet of machine control computer 81, or may be provided at a location separate from machine control computer 81. Control switch 80 may also be implemented as a "soft" switch (e.g., a switch, button, lever, or other feature) displayed on a touch-screen that may be operated by a user.

The ability to achieve a target pressure at an input of the melt pump by controlling the relative speeds of the extruder and gears of gear pump 66 may also create the ability to further refine a CNC machine such as CNC machine 1A, improving throughput while generating a properly mixed and thermally homogenized melt. For example, in an exemplary configuration shown in FIG. 4A, the target pressure may be achieved without the need to include a breaker plate or a screen. In one aspect, this may be achieved by control of gear pump 66 by a controller such as machine control computer 81, which may output commands to servo controller 79 and/or servo drive output 78. While the machine control computer 81, servo controller 79, and servo drive output 78 may be provided separately, one or more of these components may be combined. In one aspect, machine control computer 81 may form a single control device or controller that includes one or more servo controllers 79 for receiving feedback from servomotor 61 and servomotor 67, and one or more servo drive outputs 78 that generate signals to drive servomotors 61 and 67.

CNC machines 1, 1A may be configured to generate and maintain a controlled target pressure at the input end of the gear pump 66. As the input end of the gear pump 66 may also be an exit end of the extruder 60, it may not be necessary to install a breaker plate or screen at the exit of the extruder to generate the pressure required for proper mixing in the extruder. The pressure at the inlet end of gear pump 66 may be determined or measured by one or more sensors 72, which may include a pressure sensor as described above. As shown in FIG. 4A, an outlet end of the extruder 60 may also form an inlet end of the gear pump 66. Thus, sensor 72 may include a single pressure sensor that is configured to sense both a pressure of the inlet of gear pump 66 and a pressure of the outlet of the extruder 60.

In an exemplary embodiment, the CNC machines 1, 1A may generate the required pressure by controlling gear pump 66 via machine control computer 81. Machine control computer 81 may be configured (e.g., programmed with software) to allow a target pressure to be adjusted. Thus, extruder 60 and gear pump 66 may be able to accommodate different requirements that may be necessary for different materials (e.g., different polymers). In one aspect, machine control computer 81 may control extruder 60 and gear pump 66 to generate required pressure and/or adjust the pressure for a plurality of different polymers or flowable materials. For example, target pressures for a corresponding plurality of thermoplastic materials may be stored in a memory of machine control computer 81. Thus, when a first material having a first target pressure is extruded, machine control computer 81 may control the relative speeds of extruder 60 (e.g., screw 63) and gear pump 66 to reach and maintain this target pressure. When the extruded material changes to a second material, machine control computer 81 may change these relative speeds to reach and maintain a second target pressure, allowing the CNC machines 1, 1A to extrude multiple materials at different respective pressures. In one example, changing the relative speeds of the gear pump 66 and the extruder 60 may be performed by maintaining the speed of the extruder 60 constant while changing the speed of gear pump 66, or instead by maintaining the speed of gear pump 66 constant while changing the speed of extruder 60. The relative speeds may also be changed by modifying both of these speeds by differing amounts.

The ability to generate the required pressure may be accomplished with a lower-cost system that reduces mechanical complexity without the need for a breaker plate or a screen (such as a filter) between an end of the screw 63 and gear pump 66, as shown in FIG. 4A, for example. Control of gear pump 66 may be performed without unduly restricting throughput, resulting in higher flow rates for extruder 60.

In an exemplary configuration, nozzle 51 may have an open round shape (FIG. 6) which offers little resistance to material flow. Gear pump 66 may restrict flow to the nozzle 51, thereby avoiding the need to provide a nozzle having significant resistance to material flow. A desired or optimal pressure within extruder 60 may be created and maintained by controlling the relative speeds of the extruder 60 and gear pump 66.

Melt pumps may be used in steady state plastic extrusion processing for two exemplary purposes. First, melt pumps may provide a way of assuring a steady flow of material which overcomes the tendency of extruders to vary the flow rate or "surge" over time. Second, melt pumps may increase the pressure from the extruder to help force material through extrusion dies, which may have significant resistance to flow. Extruders may have a particular pressure range within which they operate optimally. If a die is provided and the pressure required to flow material through the die is higher than the optimal range, a melt pump may be used generate this higher pressure. However, by controlling flow with a gear pump (e.g., by restricting flow when necessary), the need for a breaker plate or a die may be eliminated. An optimal pressure within extruder 60 may be maintained, while pressure may be varied in a controllable manner. Thus, a predetermined pressure which is based on the requirements of the particular polymer material being extruded may be provided without changing parts. The configuration may also generate a consistent, controllable flow rate to the print nozzle, resulting in a quality print process.

Controlling flow with a gear pump may also eliminate the need for a mixing section, such as knobs, protrusions, or other shapes on the threading of an extruder screw. Thus, each of the threads of an extruder screw may present a uniform, even thread surface.

Figure 5:
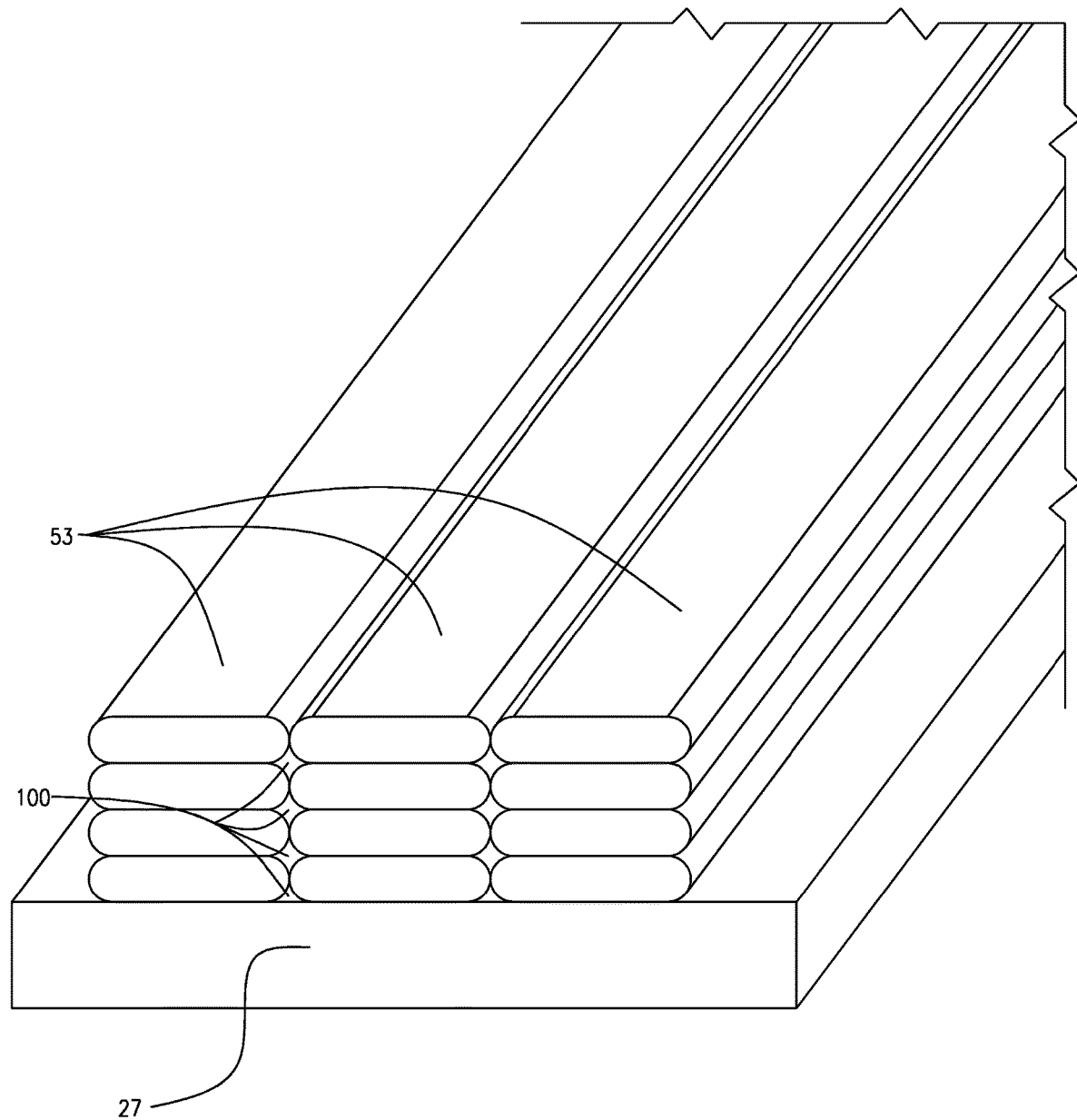
FIG. 5 is an enlarged perspective view illustrating beads of flowable material that may be deposited by the exemplary applicator head assembly of the exemplary CNC machines shown in FIGS. 1 and 1A.

When additive manufacturing is performed to form a three-dimensional object, an example of which is shown in FIG. 5, several separate beads 53 may be printed next to each other, to fuse with adjacent layers and form a solid one-piece object. Each of the two beads 53 may tend to form rounded edges. Thus, adjacent beads 53 disposed may tend to form a void or hole 100 at positions below and above the rounded edges of the beads 53. These holes 100 may be undesirable for three-dimensional objects, particularly for objects printed for use in an autoclave. In order to avoid the formation of holes 100, beads 53 may be deposited so as to overlap by a certain amount.

Figure 6:
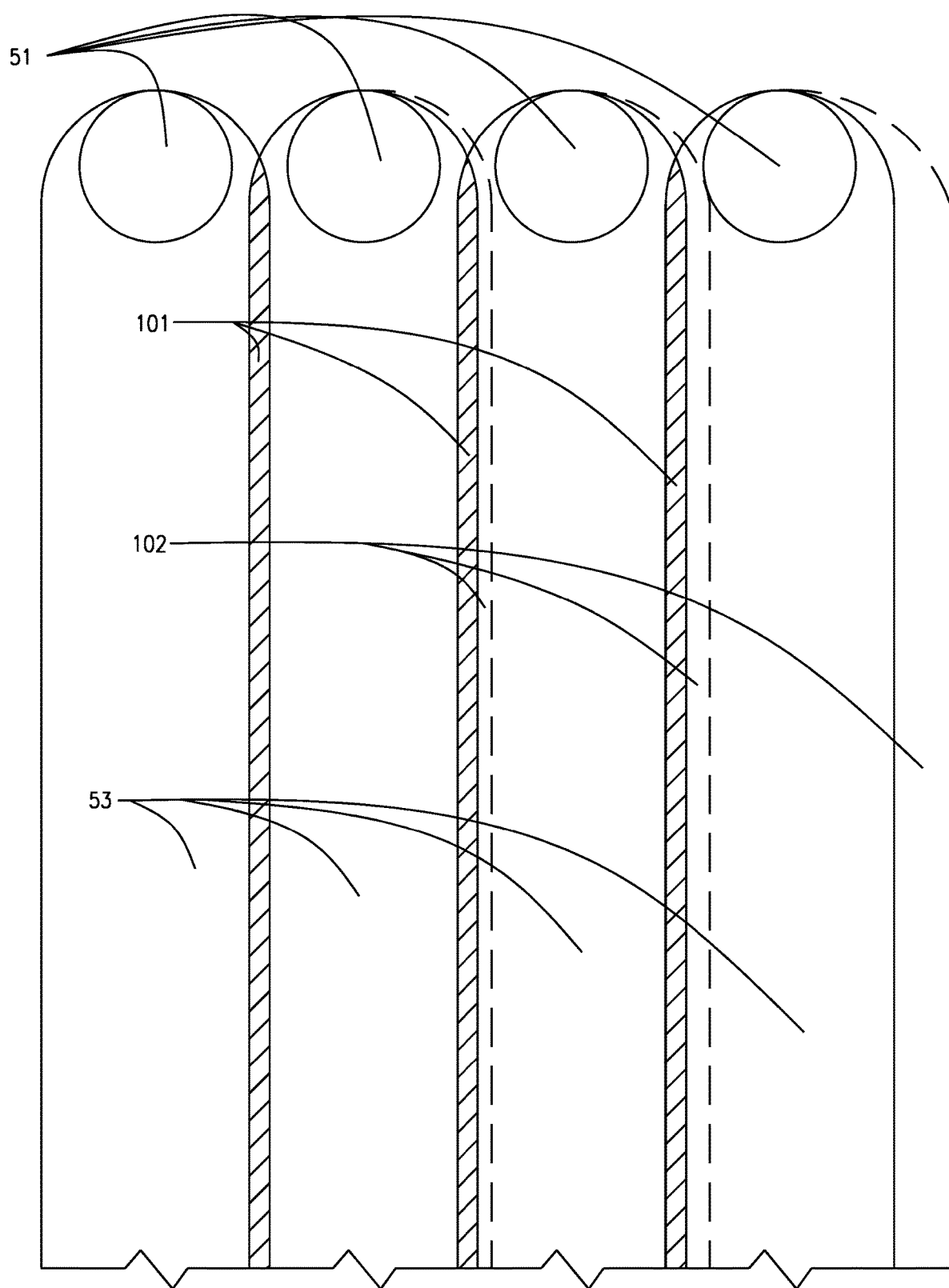
FIG. 6 is a top partially-schematic view showing beads of flowable material that may be deposited by the exemplary applicator head assembly of the exemplary CNC machines shown in FIGS. 1 and 1A.

With reference to FIG. 6, adjacent beads 53 may be deposited to have a desired overlap, which may be represented by a particular percent or amount. However, when a nozzle introduces this overlap while also moving by a constant amount throughout the print (e.g., when depositing parallel rows of beads), additional material may be squeezed out by roller 59, forming squeeze-out material 102. Squeeze-out material 102 may result in an overlap between two beads by an unintended amount in addition to the desired overlap. Squeeze-out material 102 may first occur with the third bead in a row of adjacent beads (resulting from material squeezed out when the second bead 53 is applied so as to overlap the first bead 53), and may become larger for each subsequent bead in an exponentially-increasing manner. Thus, the overlap may quickly become significant, and may even result in one bead being deposited on another full bead of squeeze-out material 102, an outcome which would be very undesirable. For example, as shown in the top view in FIG. 6, each bead may be deposited by a CNC machine 1 programmed for a constant amount or percent of desired (calculated) overlap 101. However, the actual amount the side of bead increases or squeezes out, may compound over time. As more beads 53 are printed, the squeeze-out material 102 may grow accordingly.

One potential process to counteract the formation of squeeze-out material 102 may employ a program that causes the nozzle 51 to move over the distance including the desired overlap, plus an estimated amount of squeeze-out material 102, which may continue increasing. The nozzle 51 would have to move over different distances when printing subsequent rows, which may make programming difficult.

In order to keep the amount (e.g., percentage) of overlap 101 constant for each adjacent bead and keep the nozzle 51 moving over the same consistent amount for each row formed by a bead 53, the size (e.g., width) of the third and any subsequent bead 53 may be reduced by a particular (e.g., the same) amount to prevent squeeze-out material 102 from building up. This reduction may be equal to a calculated amount of squeeze-out material 102 that would form if a size of the third bead is not reduced. This reduction may be the same for the third bead 53 and for each subsequent bead 53 adjacent to the third bead 53 in a direction perpendicular to a deposition direction.

In order to print the third bead 53 (and a subsequent bead 53) with a reduced size, the print head may provide the ability to both: produce a consistent-sized bead 53 at different machine speeds, and change the bead 53 to a smaller or larger sized bead as desired, while still producing the bead 53 with a consistent (changed) size. This may be performed altering the relationship between the machine speed (e.g., a translation speed of nozzle 51) and the melt pump speed. For example, a ratio of the machine speed to the gear pump 66 speed may be altered. Such an alteration of the machine or nozzle translation speed to the melt pump speed may be performed by at least one of a CNC "G" code program, or manually, by operating melt pump control switch 80. In one aspect, the ratio of machine speed to nozzle translation speed may be changed to a first value based on a program stored by machine control computer 81, thereby adjusting the size of the bead 53 by a first amount. The ratio of machine speed to nozzle translation speed may be changed to a second value based on the operation of control switch 80, thereby adjusting the size of the bead 53 by a second amount. In one aspect, machine control computer 81 may increase or decrease the size of the bead 53 by a first amount. Manipulation of melt pump control switch 80 may increase or decrease the size of the bead 53 by a second amount. Thus, melt pump control switch 80 may be used to increase or decrease the first amount.

The machine speed to melt pump speed relationship may be altered in the CNC program to cause an increase or decrease in bead 53 size by a particular percentage. The bead 53 size can be increased or decreased by a lesser amount than the amount specified in the CNC program by operating control switch 80. Thus, the control switch 80 may operate separately from the adjustment in the program, allowing manual adjustment of the size of the bead 53.

For example, when first starting to print a three dimensional object, the bead 53 may differ by small amount than what was originally specified by the printing program. In one aspect, a slight operation of the control switch 80 may bring the bead 53 to the exact size that was used to program the production of the three dimensional object.

In one aspect, by providing a program and/or control switch for changing bead size during printing, the formation of holes, which may be present if the bead is smaller than what was specified in the printing program, may be avoided. Additionally, excessive squeeze-out, which may be present if every bead were produced larger than a size was specified in the printing program, may also be avoided. Thus, a part may be printed in a precise manner.

Figure 7:
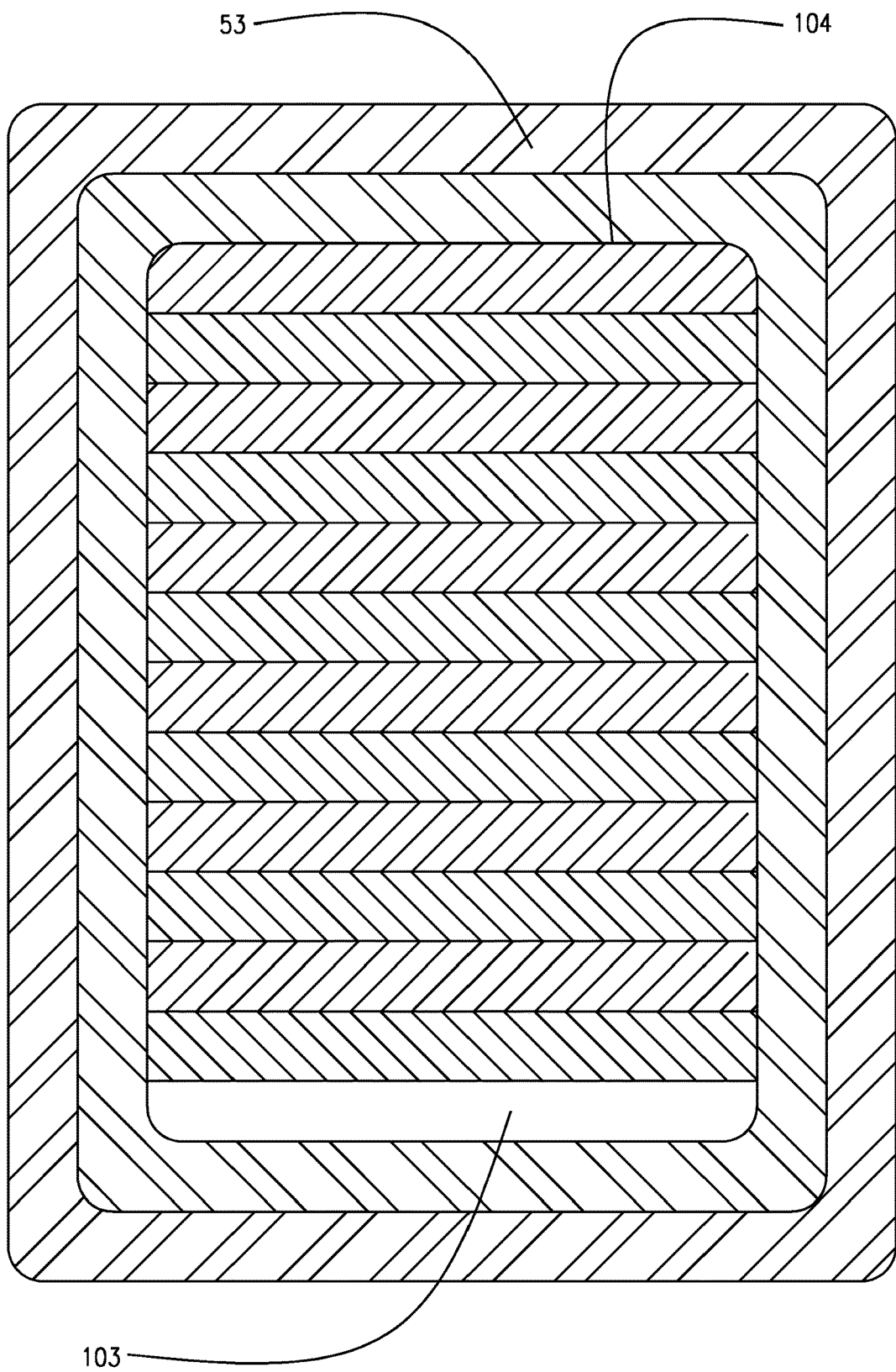
FIG. 7 is cross-sectional view showing beads of flowable material and a void that may be filled by the exemplary applicator head of the exemplary CNC machines shown in FIGS. 1 and 1A.

As shown in FIG. 7, a plurality of beads 53 of flowable material may be deposited in a manner that can form a boundary or fill area 104 (e.g., a bounded area in which one or more beads 53 may be deposited to provide a fill). By depositing one or more beads 53 in a closed path, a periphery may be defined such that boundary or fill area 104 is located within the periphery. When a boundary is formed, the boundary or fill area 104 may result in the formation of a void 103. In one aspect, control computer 81 may determine when void 103 would be formed if bead width 53 is provided with a value initially specified in a software (e.g., slicing software) program.

In one aspect, machine control computer 81 may be programmed to evaluate the boundary or fill area 104 and apply a standard size (e.g., width) for bead 53. A standard width may be specified by slicing software. Machine control computer 81 may determine when the area 104 can be filled without a void by using the standard width, and deposit beads 53 accordingly.

In one aspect, control computer 81 may determine when void 103 would be formed if bead width 53 is provided with the standard width (e.g., a value initially specified in a slicing software program). Machine control computer 81 may be configured to determine when, by varying a width of a plurality of beads 53 by a particular (e.g., the same) amount, a void 103 may be filled. This may include modifying a size of a plurality, or all, of the beads 53 within boundary or fill area 104. When control computer 81 (or a separate controller) determines that a void 103 will be formed in area 104, as shown in FIG. 7, control computer 81 may calculate a modified bead 53 size for a single bead that will completely fill void 103 in area 104. This modified bead 53 size may be larger or smaller than the standard bead size which was used to deposit adjacent beads 53. Thus, a size and/or shape of boundary or fill area 104 (and a size or shape of one or more adjacent beads in boundary or fill area 104) may be used to determine a speed of gear pump 66 and/or a speed of translation of nozzle 51 that forms a plurality of beads 53 or a single bead 53 with an adjusted size to fill void 103.

Figure 8:
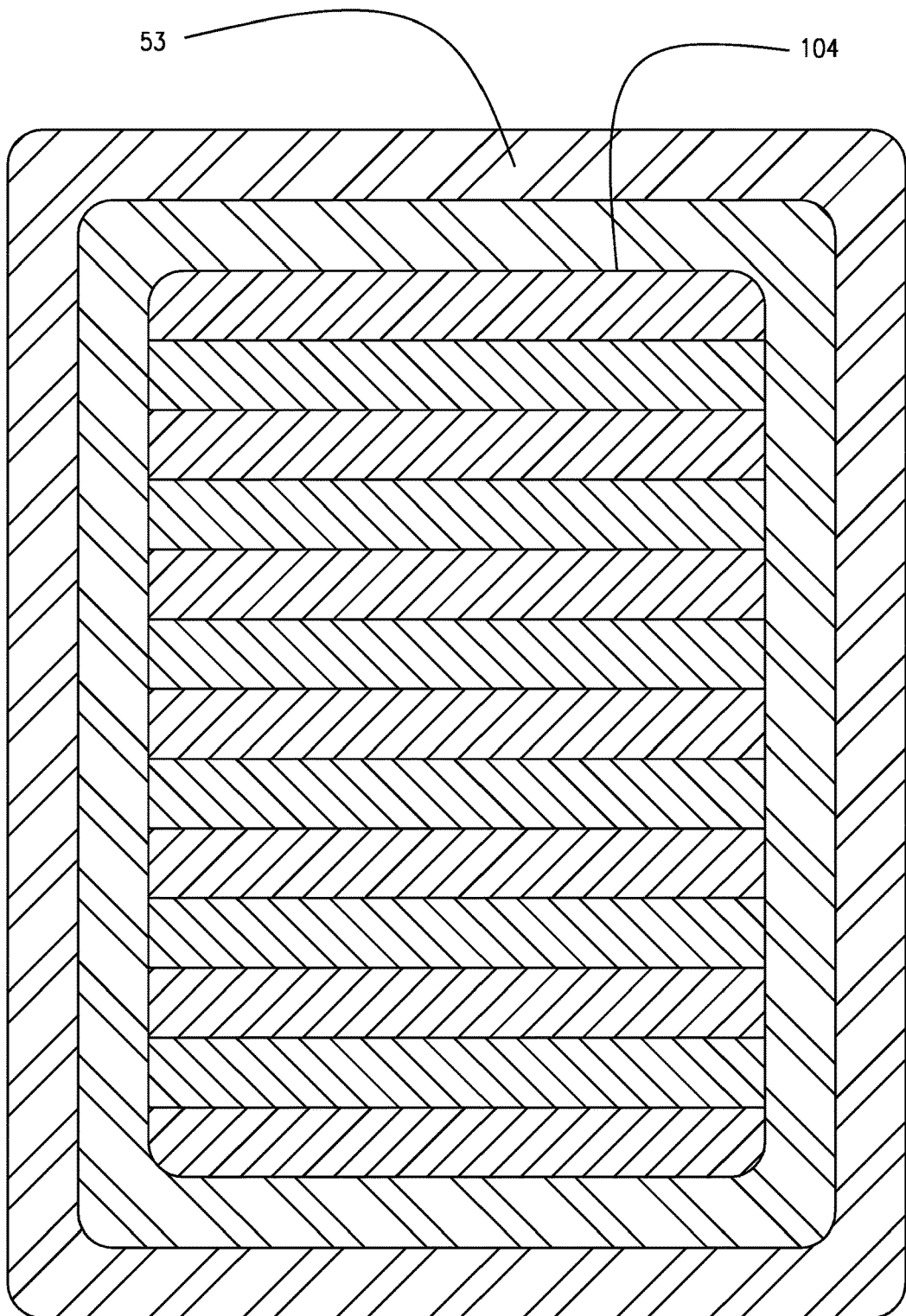
FIG. 8 is a cross-sectional view showing the void of FIG. 7 after the void has been filled with a bead of flowable material that may be deposited by the exemplary applicator head of the exemplary CNC machines shown in FIGS. 1 and 1A.

In one aspect, the slicing software programmed in control computer 81 may control the servo controller 79 to increase or decrease the machine speed (e.g., translation speed of nozzle 51) to gear pump 66 speed relationship by the amount (e.g., percentage) required to change the bead width to completely fill the boundary or fill area 104 as shown in FIG. 8. This may be performed to increase or decrease the size of a single bead 53 or a plurality of beads 53.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the inventions described herein are not to be considered as limited by the foregoing description.

We claim:

1. A system for additive manufacturing, comprising:
    a carrier movable along an x-axis, along a y-axis, and along a z-axis;
    a plurality of segments connected to a plurality of motors, the motors being configured to displace the segments relative to each other;
    an extruder connected to the carrier, the extruder including an extruder screw configured to generate heat;
    a hopper connected to a side of the extruder; and
    a control computer configured to control movement of the carrier and operation of the extruder.

2. The system of claim 1, further including a servomotor configured to drive a pump connected downstream of the extruder.

3. The system of claim 2, further including a gearbox, the servomotor configured to drive the pump through the gearbox.

4. The system of claim 3, wherein the gearbox is connected to a side of the carrier and protrudes outward with respect to the extruder.

5. The system of claim 1, further including a pressure sensor configured to measure a pressure at a location downstream of the extruder.

6. The system of claim 1, further including an applicator downstream of the extruder and downstream of a pump in communication with the extruder, the applicator carrying a nozzle for depositing material supplied from the pump.

7. The system of claim 6, wherein the pump is connected between the extruder and the nozzle.

8. The system of claim 1, wherein the extruder is connected directly to the carrier.

9. The system of claim 1, wherein the control computer is further configured to receive a signal from a pressure sensor.

10. The system of claim 9, wherein the control computer is configured to increase and to decrease a speed of a pump based on the signal from the pressure sensor.

11. A 3D printing system, comprising:
    a hopper for receiving pellets of thermoplastic material;
    a plurality of segments connected to a plurality of motors, the motors being configured to displace the segments relative to each other;
    an extruder configured to be connected to a carrier, the extruder configured to receive the pellets of thermoplastic material from the hopper;
    a pump connected downstream of the extruder; and
    a nozzle connected downstream of the pump.

12. The system of claim 11, wherein the pump is a positive displacement pump.

13. The system of claim 11, wherein a first segment of the plurality of segments is pivotable with respect to another segment of the plurality of segments.

14. The system of claim 13, wherein the first segment is movable with the nozzle.

15. The system of claim 11, further including a gearbox connected to the pump.

16. A system for additive manufacturing, comprising:
    a hopper for receiving pellets of thermoplastic material;
    a carrier movable along an x-axis, along a y-axis, and along a z-axis;
    a plurality of segments connected to the carrier;
    an extruder connected to the carrier and configured to receive the pellets of thermoplastic material, the extruder including a rotatable extruder screw;
    a pump connected to the carrier downstream of the extruder;
    a pressure sensor configured to measure pressure between the extruder and the pump;
    a nozzle downstream of the pump, the nozzle being movable according to movement of the segments; and
    a controller configured to receive control movement of the nozzle, operation of the extruder, and operation of the gear pump.

17. The system of claim 16, further including:
    a servomotor configured to drive the pump; and
    a gearbox, the servomotor configured to drive the pump through the gearbox.

18. The system of claim 16, wherein the controller is configured to increase and to decrease a speed of the pump and a speed of the extruder.

19. The system of claim 16, wherein the pump is a positive displacement gear pump.

20. The system of claim 16, wherein the controller is configured to change a speed of the extruder and a speed of the gear pump simultaneously.

* * * * *